US011730648B2

United States Patent
Jørgensen (10) Patent No.: US 11,730,648 B2
(45) Date of Patent: Aug. 22, 2023

(54) CONNECTION JOINT

(71) Applicant: R82 A/S, Gedved (DK)

(72) Inventor: Knud Jørgensen, Odder (DK)

(73) Assignee: R82 A/S, Gedved (DK)

( * ) Notice: Subject to any disclaimer, the term of this patent is extended or adjusted under 35 U.S.C. 154(b) by 910 days.

(21) Appl. No.: 16/297,906

(22) Filed: Mar. 11, 2019

(65) Prior Publication Data
US 2019/0274904 A1 Sep. 12, 2019

(30) Foreign Application Priority Data

Mar. 12, 2018 (DK) .......................... PA 2018 70155

(51) Int. Cl.
*A61G 5/12* (2006.01)
*A47C 7/38* (2006.01)
*F16C 11/10* (2006.01)

(52) U.S. Cl.
CPC ................ *A61G 5/122* (2016.11); *A47C 7/38* (2013.01); *F16C 11/106* (2013.01); *Y10T 403/32286* (2015.01); *Y10T 403/32631* (2015.01)

(58) Field of Classification Search
CPC ..... Y10T 403/32311; Y10T 403/32057; Y10T 403/32073; Y10T 403/32286; Y10T 403/32631; F16C 11/106; A47C 7/38; A47C 7/402; A47C 7/46; A47C 7/462; A61G 5/1067; A61G 5/122

See application file for complete search history.

(56) References Cited

U.S. PATENT DOCUMENTS

| | | | | |
|---|---|---|---|---|
| 4,277,102 A | * | 7/1981 | Aaras ........................ | A47C 1/03 297/411.36 |
| 4,730,871 A | * | 3/1988 | Sheldon .................. | A47C 7/462 297/284.7 |
| 5,326,206 A | * | 7/1994 | Moore ................... | F16B 5/0208 29/525.02 |
| 7,114,688 B2 | | 10/2006 | Rudolf | |
| 7,303,232 B1 | * | 12/2007 | Chen ........................ | A47C 7/38 297/284.7 |
| 7,490,901 B2 | * | 2/2009 | Maier .................... | A47C 7/448 297/291 |
| 7,841,666 B2 | * | 11/2010 | Schmitz ................... | A47C 1/03 297/440.2 |

(Continued)

FOREIGN PATENT DOCUMENTS

EP 3205235 A1 8/2017
JP 2006-26140 A 2/2006

*Primary Examiner* — Michael P Ferguson
*Assistant Examiner* — Kevin J Baynes
(74) *Attorney, Agent, or Firm* — Cermak Nakajima & McGowan LLP; James Creighton Wray (57) ABSTRACT

An adjustable connection joint has a partially shaped spherical member attached to a first member to be adjusted with respect to a second member. A slidable base member slides in a bushing which is attached to the second member. A bolt extends through a washer that spreads a slotted end of the slidable base member against the bushing. Tightening the bolt pulls a locking member against an inside of the partially spherically shaped member and pulls it against a conical cavity on an end of the slidable member. Tightening the bolt concurrently locks the slidable member in the bushing and locks a position of the partially shaped cylindrical member in the conical cavity at the end of the slidable member.

11 Claims, 7 Drawing Sheets

(56) References Cited

U.S. PATENT DOCUMENTS

| | | | |
|---|---|---|---|
| 2002/0088916 A1* | 7/2002 | March | F16M 11/2078 |
| | | | 248/549 |
| 2005/0052061 A1* | 3/2005 | Deimen | A47C 7/46 |
| | | | 297/301.1 |
| 2010/0264718 A1* | 10/2010 | Hwong | A47C 7/405 |
| | | | 297/463.1 |
| 2011/0198907 A1* | 8/2011 | Masunaga | A47C 1/03294 |
| | | | 297/353 |
| 2014/0077540 A1* | 3/2014 | Peterson | A47C 7/386 |
| | | | 297/220 |
| 2016/0356294 A1 | 12/2016 | Fenwick | |

* cited by examiner

CONNECTION JOINT

This application claims the benefit of Danish Application No. PA 2018 70155 filed Mar. 12, 2018, which is hereby incorporated by reference in its entirety as if fully set forth herein.

FIELD OF THE INVENTION

The present invention presents a connection member comprising a number of parts which will be described in the description above. This type of connection member is particularly useful for example when connecting a head- or backrest to a support structure such as for example the frame structure of a chair, wheelchair or other member.

Naturally, the connection member may also be used in a multitude of other applications, but in order to explain the invention the connection of a backrest member to a chair frame structure will be used.

BACKGROUND OF THE INVENTION

In the art it is quite common to connect for example back- and headrest to chair constructions in such a manner that the back- and headrest may be adjusted vertically in order to adjust the support parts of the head- or backrest to the particular user of the chair.

In addition to the vertical adjustment some more advanced backrests and headrests also allow the head and backrest to tilt back and forth in order to adjust the back- and headrest to the desired sitting position. By furthermore shaping and forming the back- and headrest it is possible to increase the support of the user such that substantially adequate overall support is possible with these adjustment possibilities.

However, in a number of instances it is desirable to be able to provide further adjustment possibilities. This may for example be in cases where special needs have to be addressed such as for example chair constructions for persons with special needs, for example having physical disabilities which require support outside the limitations of the more normal adjustment possibilities as already discussed above.

Users with physical disabilities will need to have specially manufactured chairs and backrests in order to provide support in the correct places. This is both time consuming and very expensive, and as such a number users having these special needs refrain from obtaining for example backrests which can address their particular needs and thereby end up with for example chairs or other types of seats which are not optimal and thereby do not provide adequate support and the desired comfort. This is further aggravated seen in the light that these types of persons usually use their seats be it in wheelchairs or specially designed seats much more than other people, and as such the inconveniences of the limited adjustment possibilities with the present type of adjustment mechanisms do not provide the comfort and if the very expensive custom-made solutions are selected, only a few seats will be manufactured to these specifications.

Alternatively, the user having such special needs will have to do with the rather uncomfortable standard seats and limited adjustment possibilities which in the long run will not provide the necessary comfort.

OBJECT OF THE INVENTION

It is therefore the object of the present invention to provide a connection member which can be used in such seating arrangements, particularly with respect to backrests and headrests which in a simple manner provides in theory unlimited adjustment possibilities whereby the comfort for a user having special needs may be greatly increased.

DESCRIPTION OF THE INVENTION

The invention addresses this by providing a connection member where
a. a first slidable base member, where said slidable base member in a first end has a first conically shaped cavity, and in a second end has a portion extending from the distal end towards the first end, where a plurality of slits are provided in said portion, where said first slidable base member between the first conically shaped cavity and said second end has a cylindrical cross-section orthogonal to a longitudinal direction of said first slidable base member, and where
b. a washer having at least one conical section providing expansion means arranged at least partly inside said first slidable member in the vicinity of the slits adjacent the second end, where said conical section is able to urge the first slidable member's portion provided with slits outwards and expand beyond the circumference of the cylindrical section;
c. A bushing arranged outside said first slidable member, such that the slidable member may slide relative to the bushing in an axial direction, and
d. A first partly shaped spherical member, having a spherical part with an inner and an outer surface, said spherical part's outer surface adapted to be at least partly inserted in the conically shaped cavity of the first slidable member, and said spherical parts inner surface being suitable to engage
e. A first locking member having an outer surface adapted to engage said inner surface of the first partly spherical member, and a threaded aperture, said threaded aperture is threadily engaged to;
f. a threaded bolt, said bolt having a thread in one end engaging the thread of the locking member and a head section in the opposite engaging the washer,
g. And where the first partly spherical member and the bushing or the washer comprises fastening means for fastening the first partly spherical member and the bushing or the washer to said first and second members.

As already mentioned above, the invention will be described with reference to a back- or headrest, but it should be understood that the mechanical construction as set out above may be applied to a number of applications, but in order to explain the construction and its possibilities reference will be made to a headrest.

Therefore, the first member may be the cushion including the cushion support which is to be the surface on which a user's heard rests.

The second member may be the chair's support structure and therefore the connection joint provides a very flexible and adjustable connection between the headrest and the support structure.

The first slidable base member slides in a bushing where the bushing is arranged outside the first slidable member. In this manner the slidable member may move relative to the bushing such that the slidable member can move back and forth in a guided manner where the bushing acts as the guide member more or less comparable to a piston inside a cylinder.

In this manner the first member may be positioned at different relative distances to the second member.

The first member is connected to the first partly shaped spherical member. For this purpose the first slidable base member in one end is provided with a first conically shaped cavity such that the spherical part of the first partly shaped spherical member may be accommodated inside the first conically shaped cavity. By furthermore dimensioning the measurements of the first conically shaped cavity and the spherical part's outer surface appropriately as will be discussed below, it is possible to obtain contact between the first partly shaped spherical member and the conically shaped cavity of the first slidable base member such that the first partly shaped spherical member when exposed to a pressure into the concave cavity will be substantially fixed relative to the conically shaped cavity of the first slidable base member. In order to achieve this engagement force a locking member is arranged inside the first partly shaped spherical member such that the first locking member engages an inner surface of the first partly shaped spherical member.

This locking member is by means of a threaded bolt connected to a washer. For the purpose of creating an engagement force between the first partly shaped spherical member and the first slidable base member the washer provides resistance against the first slidable member such that as the bolt is rotated whereby the thread of the locking member is activated bringing the first partly shaped spherical member into contact with the first slidable base member the bolt action will create the engagement force thereby locking the first partly shaped spherical member relative to the first slidable base member.

The washer has a further function, namely that the washer is also provided with a conical section. In the end of the first slidable base member, where the washer is to be inserted, the first slidable base member is provided with slits in the axial direction of the first slidable base member, such that as the conical section of the washer due to the bolt action is forced into engagement with the first slidable base member (moved axially), the conical section of the washer will exert outwards pressure on the section of the first slidable base member such that the material between the slits will be urged outwards and into firm engagement with the bushing.

The bushing in turn is fastened to the second member which may be the structure of the chair to which the backrest or headrest normally is fastened. In this manner by tightening the bolt and thereby squeezing all the different members mentioned above together they will be locked together in a certain fixed position. By furthermore releasing the bolt allowing space between the separate parts it is possible due to the conical and concave properties of the various parts to adjust the angle's tilt and orientation of the first member relative to the second member.

Furthermore, when the bolt is released the washer will disengage from the end of the first slidable base member where the slits are provided whereby the pressure between the first slidable base member and the bushing will be released making it possible to slide the first slidable base member axially relative to the bushing. In this manner it is possible to increase or decrease the distance between the first member and the second member.

Therefore, with the relative engagements and conical/concave surfaces and tightening means a complete versatile and completely freely adjustable connection joint is provided between a first and second member.

In further advantageous embodiments at least part of the first conically shaped member member's inner surface is described by a first radius and where at least part of the first partly spherical member's outer surface is described by a second radius.

By further varying the relationship between the first radius and the second radius, i.e. where the first radius is equal to or larger than the second radius or the opposite where the first radius is equal to or smaller than the second radius the interface, i.e. the geometrical shape where the first conically shaped cavity's inner surface engages with the first partly spherical member's outer surface, describes a circle.

This very concentrated and limited engagement between the first conically shaped member and the first partly spherical member foresees that a relatively small force creates a very rigid connection.

This is due to the fact that even a small force which is created by tightening the bolt and washer is distributed on a very small area such that the force per area unit becomes very high. This ensures a very rigid and steady connection.

In a still further advantageous embodiment the rigid connection between the first conically shaped member and the first partly spherical member may be improved by providing at least part of the first conically shaped cavity's inner surface and/or at least part of the first partly spherical member's outer surface is provided with a texture, grooves, ridges, dots, or hollows.

In this manner the textured surfaces or otherwise non-smooth surfaces, increases the friction between the two parts, such that an even more fixed connection is created between the two different parts.

In a still further advantageous embodiment of the invention the angle between the first conically shaped cavity and the first partly spherical member where they engage is between 1° and 7°, preferably between 1.5° and 3°, and most preferred 2°.

It is clear that by providing a relatively shallow engagement angle between the two surfaces a well-defined contact area is provided between the two parts. On the other hand, if the angle is too shallow a not so well-defined contact may be provided. Tests and research have therefore determined that angles in the interval mentioned above provide for a safe and very secure and rigid connection such that once the two parts, i.e. the first conically shaped cavity, is engaged with a first partly spherical member an extremely rigid and steady connection is provided. It is clear that extremely violent treatment of the backrest may induce relative displacement of the two parts, but for normal use and even for abnormal use the connection is very strong.

In order to ensure that the materials act in the manner described above and which is basis for the entire invention it is advantageous to select the materials from which the various parts of the connection joint is made, such that the connection joint is both durable and will offer long and extended use retaining its advantageous properties.

For these reasons the invention in a further advantageous embodiment describes that the first slidable members and/or washers and/or bushings and/or partly spherical members and/or first locking members and/or threaded bolts are manufactured from one or more of the following materials: stainless steel, aluminum, brass, bronze, plastics, modified plastics.

DESCRIPTION OF THE DRAWING

The invention will now be explained with reference to the accompanying drawings wherein.

DETAILED DESCRIPTION OF THE INVENTION

Figure 1:
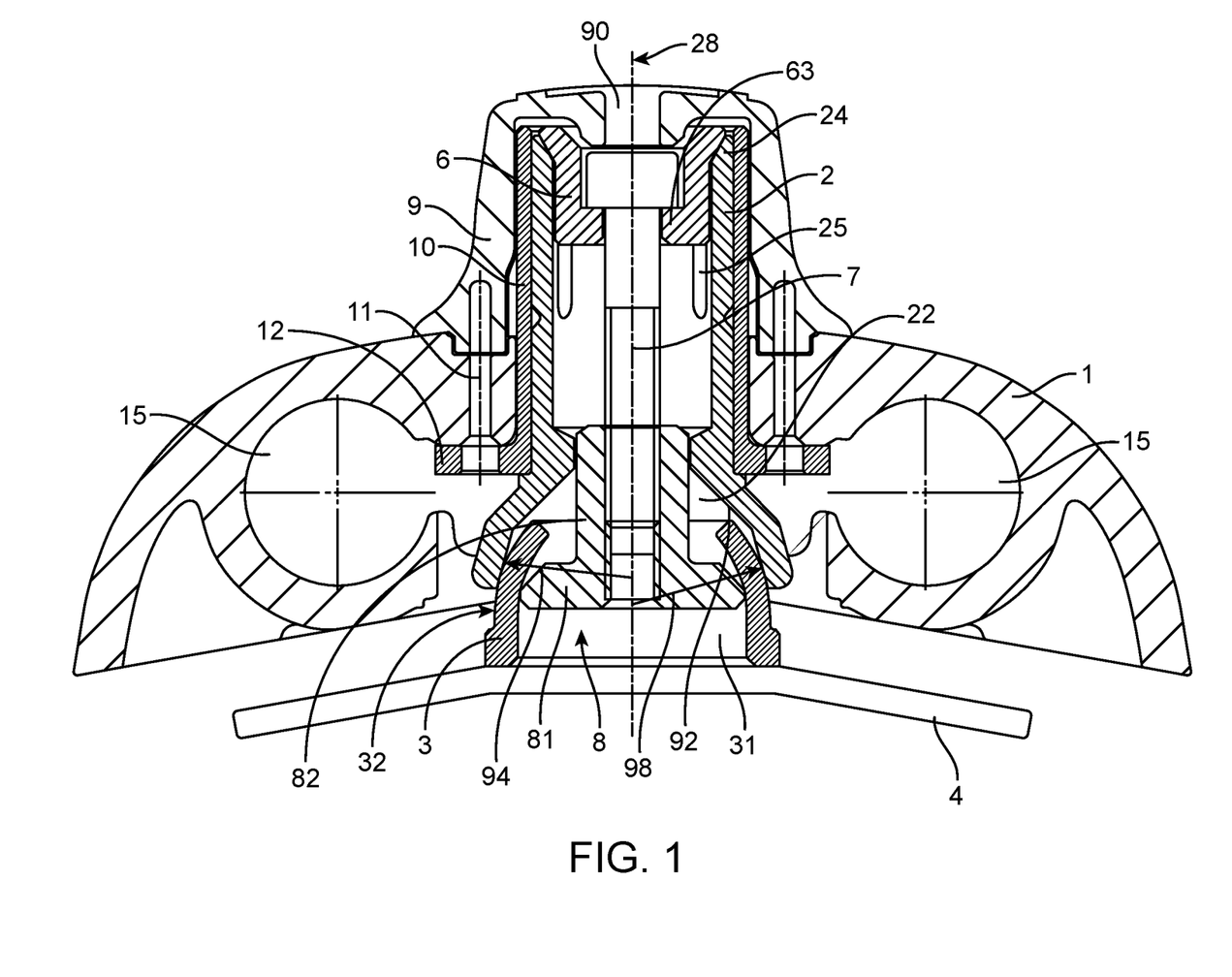
FIG. 1 illustrates a cross-section through a connection joint according to the invention

In FIG. 1 is illustrated a cross-section through a connection joint according to the invention.

In this embodiment the first member 4 is illustrated as being a flange suitable to attach a support such as for example a lumbar support, a back support, a neck or head support or any other type of support to a structure 1 (second member) being part of the chair construction.

In this embodiment the structure 1 may be adjusted up and down along guide means (not illustrated) inserted in the apertures 15.

The connection joint is furthermore provided with a cap 9 which during normal use will cover part of the connection joint as will be explained below.

Figure 2:
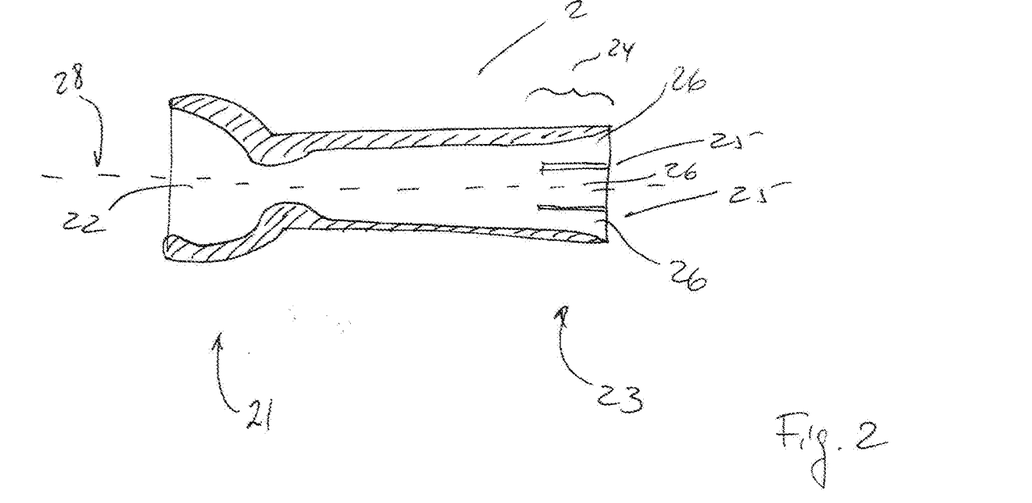
FIG. 2 illustrates a first slidable base member

The connection joint comprises a first slidable base member 2 where said slidable base member 2 in a first end 21, see FIG. 2, has a first conically shaped cavity 22. In a second end 23 there is a portion 24 extending from the distal end towards the first end 21 where a plurality of slits 25 are provided.

Between the first conically shaped cavity 22 and the second end 23 the first slidable base member has a cylindrical cross-section orthogonal to a longitudinal direction illustrated by the dashed line 28. In this connection cylindrical cross-section shall be understood as a solid generated by a straight line moving without change of direction and describing with its end any fixed curve. The most well-known cylindrical shape is a circular cross-section, but the definition also comprises oval, elliptical, rectangular (and square) etc.

The cylindrical section corresponds to where a bushing 10 is positioned. The bushing 10 is typically fastened to the second member—in this example by the bushing 10 being provided with one or more flanges 12, such that screws 11 may be inserted and fasten the bushing to the second member 1.

Figure 3:
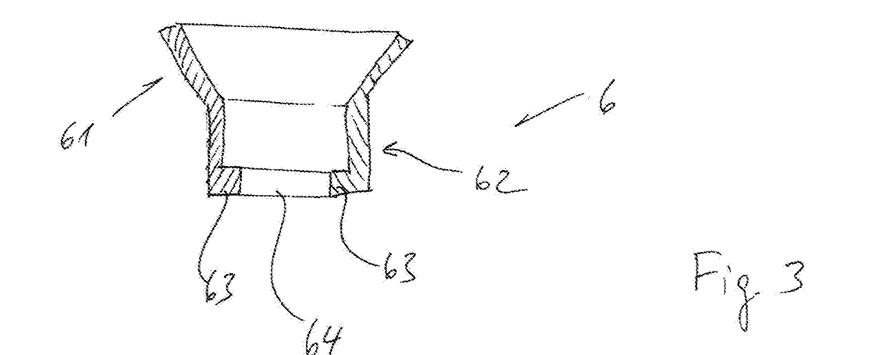
FIG. 3 illustrates and embodiment where the washer 6 furthermore has a cylindrical section

The connection joint further comprises a washer 6 which is illustrated in more detail in FIG. 3. The washer 6 has a conical section 61 such that as the washer 6 is inserted in the second end 23 of the first slidable base member 2 the conical section 61 will urge the material 26 between the slits 25 outwards and into contact with the bushing 10. In this manner the first slidable member 2 is fixed relative to the bushing 10 and thereby relative to the second member 1.

In a non-illustrated embodiment the washer 6 is inserted further into the first slidable base member 2. Furthermore the first slidable base member 2 is provided with a ridge on the outside arranged along the outer circumference of the slidable base member 2.

A further ridge is provided circumferentially on the inner surface of the bushing 10. As the first slidable base member 2 is displaced relative to the bushing 6 the ridges of the slidable base member 2 will engage the corresponding ridge on the bushing 6. For this reason the engaging faces of the ridges are typically chamfered. As the ridges engage, the bolt 7 will force them together thereby locking the first slidable member 2 in position relative to the bushing 6. With this construction less play will occur, which is particularly important when the longitudinal extend of the bushing and the first slidable base member is relatively limited.

In this embodiment illustrated in FIG. 3 the washer 6 furthermore has a cylindrical section 62 which fits inside the cylindrical section of the first slidable base member such that the inner side of the cylindrical section of the first slidable base member 2 will guide the cylindrical section 62 of the washer 6.

Furthermore, the washer is provided with notches or a flange 63 perpendicular to the longitudinal axis of the aperture provided in the washer, such that a head of a bolt 7 (see FIG. 1) will be retained on the notches/flange 63 on the washer 6 whereas the cylindrical part of the bolt will be able to pass through the aperture 64 provided in the washer.

Arrow 94 represents a perpendicular distance of a cone from its axis. Arrow 98 is a radius of a partly spherical surface.

In the opposite end of the first slidable base member 2 a first partly shaped spherical member 3 is provided.

The outer shape of the first partly shaped spherical member is shaped such that it is able to engage the first conically shaped cavity 22 of the first slidable base member 2.

Figure 4:
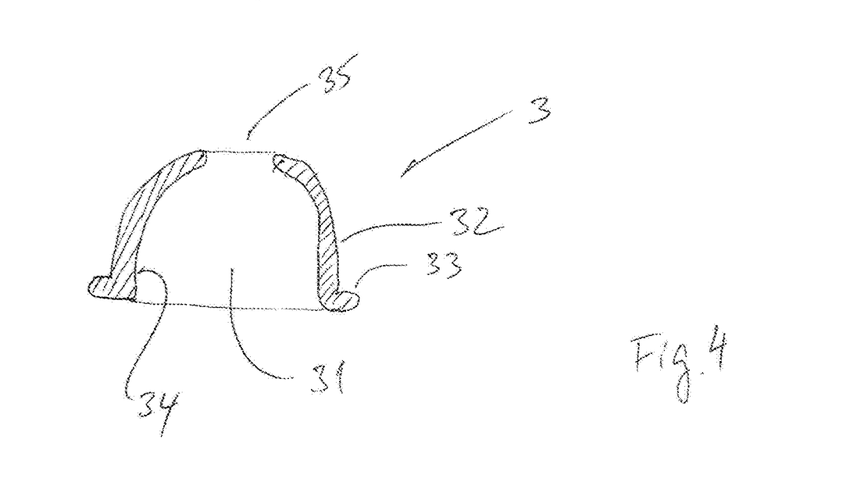
FIG. 4 illustrates the first partly shaped spherical member 3 provided with an inner cavity

Furthermore, as illustrated with reference to FIG. 4 the first partly shaped spherical member 3 is provided with an inner cavity 31 in order to accommodate a locking member which will be further described below.

The outer surface 32 is shaped such that when inserted into the first conically shaped cavity 22 of the first slidable member 2 it will substantially have an engagement surface/interface between the first partly shaped spherical member and the conically shaped cavity 22 describing a ring or circle. This is not illustrated.

For these purposes the curve described by the outer surface 32 of the first partly shaped spherical member is different from the curve described by the first conically shaped cavity 22. In the design of the mutual engagement between the first partly shaped spherical member and the first slidable base member it is desirable to attain an angle between the spherical member and the shaped cavity in the range of 1-7°, more preferred 2°.

At these shallow angles a firm contact will be established by the surface 32 and the inner surface of the first conically shaped cavity 22. Therefore it is easy with relatively little force urged by the bolt 7 as explained above and as will be further explained below to achieve a very firm and reliable engagement between these two parts.

The first partly shaped spherical member is furthermore provided with a flange 33 substantially circumscribing the outer periphery of the first partly shaped spherical member 3. This flange 33 is used in order to attach the first member to the first partly shaped spherical member. This connection may for example be created by screws, bolts, or by other suitable means.

Figure 5:
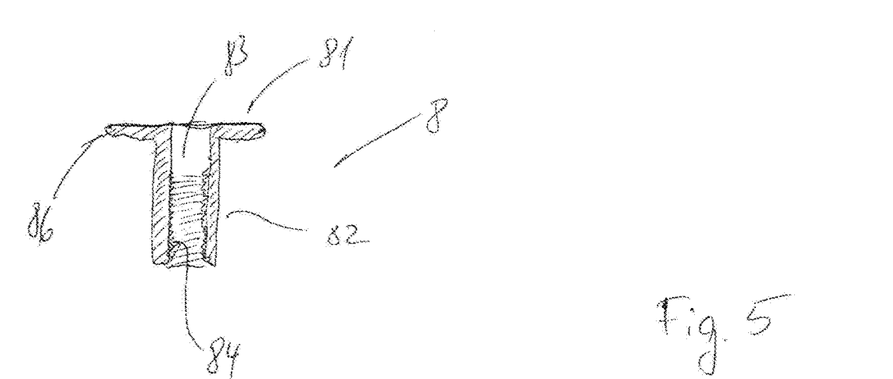
FIG. 5 illustrates a first locking member

In FIG. 5 is illustrated a first locking member 8. The locking member is provided with a flange 81 provided in the distal end of a cylindrical portion 82. The interior 83 of the cylindrical portion 82 is provided with a thread 84 corresponding to the thread on the bolt 7, see FIG. 1. In this manner the first locking member 8 may threadingly engage the bolt 7.

The perimeter 86 of the flange 81 is shaped such that it is suitable to engage the inner surface of the cavity 31 on the first partly shaped spherical member 3. With respect to the shape of the perimeter 86 and the size of the flanges 81 they shall be corresponding in size such that it will be possible to bring the perimeter 86 of the first locking member 8 into firm engagement with the inner surface of the first partly shaped spherical member's cavity 31.

In order to assemble the connection joint as described above the first member, for example a lumbar support, is fixed to the first partly shaped spherical member. In this connection it may be advantageous to provide the first member with an aperture such that access may be gained to the inner cavity 31 of the first partly shaped spherical member 3.

Prior to fastening the first member onto the flanges 33 of the first partly shaped spherical member a first locking member 8 is positioned inside the cavity 31 of the first partly shaped spherical member 3. The cylindrical portion 88 of the first locking member 8 is inserted through the aperture 35 provided in the first partly shaped spherical member.

The perimeter 86 provided on the flanges 81 of the first locking member 8 will eventually come into contact with the inner surface 34 of the cavity 31 provided on the first partly shaped spherical member 3.

Figure 9:
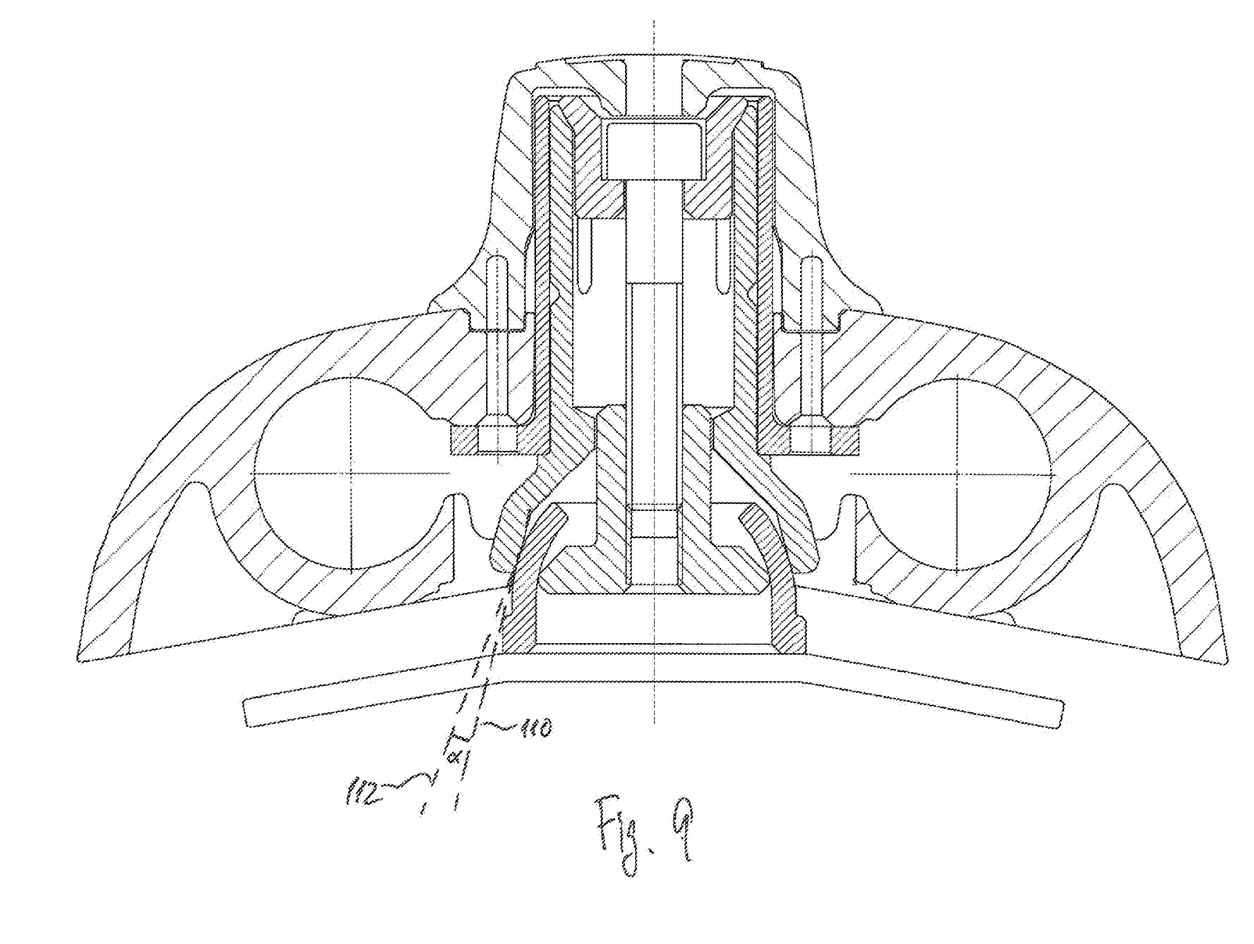
FIG. 9 shows angular intersection of contacting surfaces of the partly shaped spherical member and the conical member.

FIG. 9 shows an angle a between lines 110 and 112 representing the surfaces of the partly spherically shaped member and the inside of the conical member when they are locked or about to be locked by tightening the bolt.

After now having discussed and described the most important parts of the connection joint according to the invention, the functioning of the connection joint will now be explained. In order to do this, attention is directed to FIG. 1.

In order to install a connection joint according to the invention, the bushing 10 is fastened to the second member for example the backrest of a chair being provided with an aperture in which the parts of the connection joint will fit. In the embodiment illustrated in FIG. 1, the bushing 10 is inserted in an aperture in the second member 1. In what will be the rear side of the second member in use, a cap 9 is positioned covering the open end of the bushing and two screws 11 are fitted through suitable apertures in the flange of the bushing such that they will fasten the bushing to the second member and also attach the cap 9 to the assembly.

Figure 6:
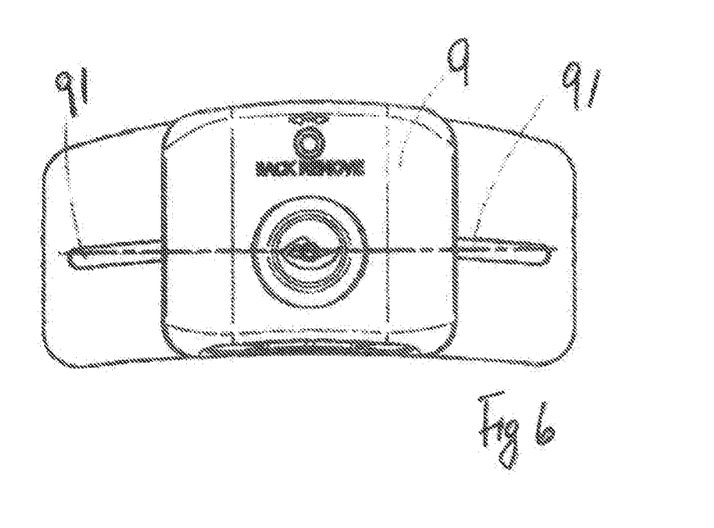
FIG. 6 illustrates the cap on the back of the connection joint.
Figure 7A:
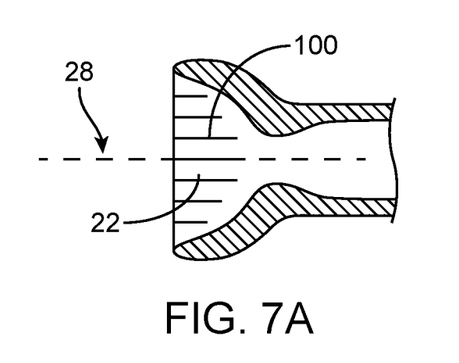
FIGS. 7a, 7b, 8a and 8b show the first conically shaped cavity and the partly shaped spherical member with textures, grooves, ridges, dots and hollows.
Figure 7B:
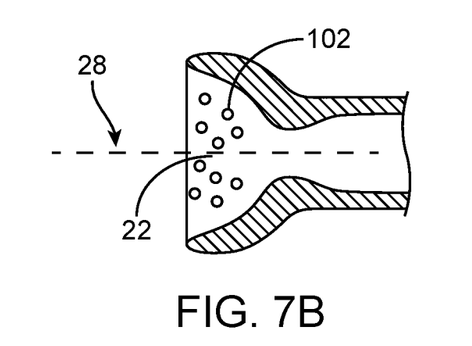
Figure 8A:
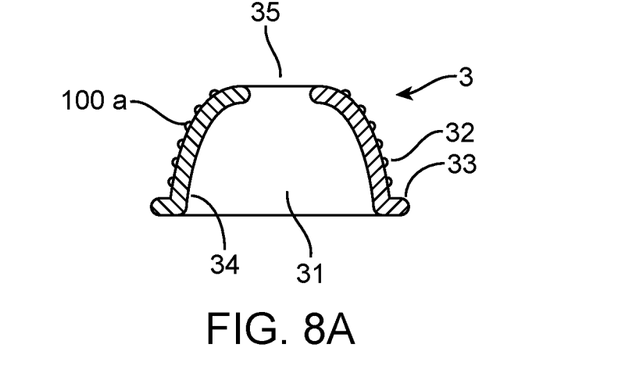
Figure 8B:
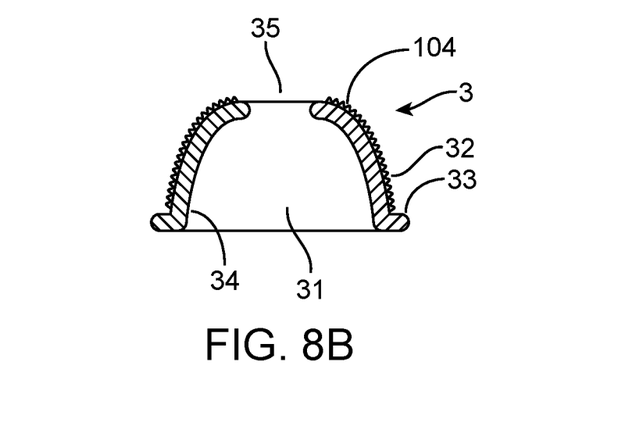

In this position, the interior of the bushing is accessible from the opposite side to the cap. At this stage, a pre-assembly is inserted into the bushing. The pre-assembly comprises the washers 6 inserted in a free end of the first slidable member 2. Inside the first slidable member 2 in a free end of this is arranged the washer through the aperture in which the bolt 7 is placed. The threaded end of the bolt is engaged with the locking member that in return is positioned inside the first partly spherical member's cavity 31. Turning to FIG. 6 the cap 9 is provided a small aperture 90 providing an access to the head of the bolt 7 such that a tool may be inserted through the aperture 90 in order to manipulate the bolt 7. By manipulating the bolt i.e. rotating the bolt such that the engaging threads of the locking member and the threaded part of the bolt is either tightened or released, the entire connection joint may be locked. By tightening the bolt 90, the locking member 8 will come into engagement with the cavity provided in the first partly spherical member 3, thereby forcing the first partly spherical member 3 into contact with the first conically shaped cavity of the first slidable base member such that there also between these two will be established a substantially fixed connection due to the increased friction created by the bolt.

Naturally before tightening the bolt 7, the first member 4 should be positioned in the correct position. Before tightening the bolt 7 i.e. all the parts such as the first slidable member 2, the washer 6, the locking member 8 and the first partly spherical member 3 are all able to move relative to each other and as the washer has not exerted a pressure on the inside of the first slidable base member, the flaps of the first slidable base member have not engaged the bushing and are thereby possible to move the bushing together with the parts actually along the longitudinal direction of the bolt inside the bushing. When the desired position of the first slidable base member relative to the bushing is attained, the first member 4 shall be provided with the desired angularity i.e. be tilted up-down or sideways in order to adjust the first member 4 relative to the intended use. At this stage when tightening the bolt by inserting a tool through the aperture 90, it is possible to completely fix all the parts relative to the second member, such that a three dimensional positioning of the first member 4 relative to the second member has been established.

Naturally, the first member may be attached to the flanges of the first partly spherical member by a screw connection where the screws are fastened through elongated apertures in the first member whereby the first member may be translated in the direction of the elongated apertures before the locking screws are fixed. This is illustrated in FIG. 6 where the elongated apertures 91 extend beyond the cap 9. The cap 9 serves to cover the various parts of the connection joint.

The invention claimed is:

1. Connection joint between a first member and a second member where said connection joint comprises:
   a. a first slidable base member, where said slidable base member in a first end has a first conically shaped cavity, and in a second end has a portion extending in a longitudinal direction towards the first end, where a plurality of slits are provided in said portion, where said first slidable base member between the first conically shaped cavity and said second end has a cylindrical cross-section orthogonal to the longitudinal direction of said first slidable base member,
   b. a washer having at least one conical section providing expansion means, said washer arranged at least partly inside said first slidable base member in the vicinity of the slits adjacent the second end, where said conical section is able to urge the first slidable base member's portion provided with slits outwards and expand beyond the circumference of the cylindrical cross section when forced into the first slidable members portion provided with slits;
   c. a bushing arranged outside said first slidable base member, such that the first slidable base member may slide relative to the bushing in an axial direction, and wherein in use the bushing is arranged such that as the conical section of the washer is forced into engagement with the first slidable base member the conical section of the washer will urge the material between the slits of the first slidable base member outwards and into contact with the bushing,
   d. a first spherical member, having a spherical part with an inner and an outer surface, said spherical part's outer surface adapted to be at least partly inserted in the conically shaped cavity of the first slidable base member, and said spherical parts inner surface being suitable to engage:
e. a first locking member having an outer surface adapted to engage said inner surface of the first spherical member, and having a threaded aperture, said threaded aperture is threadily engaged to:
f. a threaded bolt, said bolt having a thread in one end engaging the threaded aperture of the locking member and a head section in an opposite end engaging the washer,
g. and where the first spherical member is affixed and securely coupled to said first member and a flange of the bushing is fastened to the second member.

2. Connection joint according to claim 1 wherein the first member is a back rest and the second member is part of a chair's back construction.

3. Connection joint according to claim 1 wherein at least part of an inner surface of the first conically shaped cavity is described by a first radius and where at least part of the first spherical member's outer surface is described by a second radius.

4. Connection joint according to claim 3, where the first radius is equal to or larger than the second radius.

5. Connection joint according to claim 3, where the first radius is equal to or smaller than the second radius.

6. Connection joint according to claim 1, wherein at least part of an inner surface of the first conically shaped cavity and/or at least part of the first spherical member's outer surface is provided with a texture, grooves, ridges, dots, or hollows.

7. Connection joint according to claim 1 wherein an angle between the first conically shaped cavity and the first spherical member where they engage is between 1° and 7°.

8. The connection joint according to claim 7, wherein the angle is between 1.5° and 3°.

9. The connection joint according to claim 7, wherein the angle is 2°.

10. Connection joint according to claim 1, wherein the first slidable base member and/or washer and/or bushing and/or first spherical member and/or first locking member and/or threaded bolt are manufactured from one or more of the following materials: stainless steel, aluminum, brass, bronze, plastics, modified plastics.

11. Chair, comprising a lumbar support and/or a back support and/or a neck or head support, where the lumbar support and/or a back support and/or a neck or head support is connected to the rest of the chair by a connection joint between a first member and a second member, where said connection joint comprises:
a. a first slidable base member, where said slidable base member in a first end has a first conically shaped cavity, and in a second end has a portion extending in a longitudinal direction towards the first end, where a plurality of slits are provided in said portion, where said first slidable base member between the first conically shaped cavity and said second end has a cylindrical cross-section orthogonal to the longitudinal direction of said first slidable base member,
b. a washer having at least one conical section providing expansion means, said washer arranged at least partly inside said first slidable base member in the vicinity of the slits adjacent the second end, where said conical section is able to urge the first slidable base member's portion provided with slits outwards and expand beyond the circumference of the cylindrical cross section when forced into the first slidable base members portion provided with slits;
c. a bushing arranged outside said first slidable base member, such that the slidable base member may slide relative to the bushing in an axial direction, and wherein in use the bushing is arranged such that as the conical section of the washer is forced into engagement with the first slidable base member the conical section of the washer will urge the material between the slits of the first slidable base member outwards and into contact with the bushing,
d. a shaped spherical member, having a spherical part with an inner and an outer surface, said spherical part's outer surface adapted to be at least partly inserted in the conically shaped cavity of the first slidable base member, and said spherical parts inner surface being suitable to engage:
e. a first locking member having an outer surface adapted to engage said inner surface of the first spherical member, and having a threaded aperture, said threaded aperture is threadily engaged to:
f. a threaded bolt, said bolt having a thread in one end engaging the threaded aperture of the locking member and a head section in an opposite end engaging the washer,
g. and where the first spherical member is affixed and securely coupled to said first member and a flange of the bushing is fastened to the second member.

* * * * *